Nov. 14, 1967  G. L. FOURETIER  3,352,150
STRAIN-GAUGE POTENTIOMETER
Filed Aug. 7, 1964  3 Sheets-Sheet 2

INVENTOR
GEORGES L. FOURETIER
BY
Abraham A. Saffitz
ATTORNEY 3,352,150
STRAIN-GAUGE POTENTIOMETER
Georges L. Fouretier, Paris, France, assignor to Societe d'Etudes et de Realisations d'Installations de Mesure (S.E.R.I.M.), Bagnolet, France, a company of France
Filed Aug. 7, 1964, Ser. No. 388,128
Claims priority, application France, Aug. 9, 1963, 944,327; Oct. 14, 1963, 950,539
4 Claims. (Cl. 73—88.5)

This invention relates to sliderless and self-balancing potentiometers, more particularly to strain-gauge potentiometers.

Very small electric voltages can of course be measured by potentiometers whose adjustable contact or slider is supplied by a voltage source and which are operated by servomotor supplied with a signal equal to the difference between the voltage to be measured and the potentiometer output voltage or which can be supplied with a more complex signal which is derived from such difference and which disappears when said signal disappears. In such prior art systems the servomotor drives the potentiometer slider to vary the potentiometer resistance. Even when moving slowly the slider has a contact resistance; this can be obviated but requires additional apparatus so the system is corrected only by complicating the potentiometer. At high slider speeds, there is a rapid wear of the contacting parts which occurs, while the friction between the slider and the element which it contacts produces thermoelectrical voltages which introduce errors into the measurements and which can be obviated only by means of delicate compensation apparatus.

Sliderless potentiometers using unbonded strain-gauge wires have also been proposed. These devices comprise a feedback element formed by strain gauge wires and means for varying the length thereof according to the output signal of the measuring apparatus and a Wheatstone bridge having as its resistors these strain-gauge wires and whose unbalanced signal is subtracted from the measuring signal to form an error signal. The mechanical output of the apparatus causes a change in the length of one or more strain-gauge wires and therefore causes a variation in the unbalanced voltage output of the bridge. Since, in these devices, the output mechanical motion is much larger than the motion of the wire, a motion-reducing mechanism must be employed and this motion-reducing mechanism, due to the slack of the gears it comprises, is the cause of a lack of precision of the device.

The object of the invention is to provide a self-balancing potentiometer of the strain-gauge wires and Wheatstone type having no motion-reducing mechanism or motion-reducing mechanism of substantially small ratio.

According to the invention, the potentiometer comprises essentially a potentiometer frame means, two resilient strips of uniform thickness having one end fixed to said frame means and the other end provided each with a rigid extension member aligned with said associated strip, strain-gauges stuck to the two faces of each strip and connected up as a Wheatstone bridge, and means which is anchored to the top ends of said extension members for bending said strips in opposite directions from an equilibrium position thereof. It is to be noticed that the mechanical input movement is applied not directly to the strain-gauge wires but to resilient strips to which the strain-gauges are stuck.

These structural features and operating advantages of the sliderless strain-gauge potentiometer of this invention will become apparent from the following description and accompanying drawings wherein.

Figure 1:
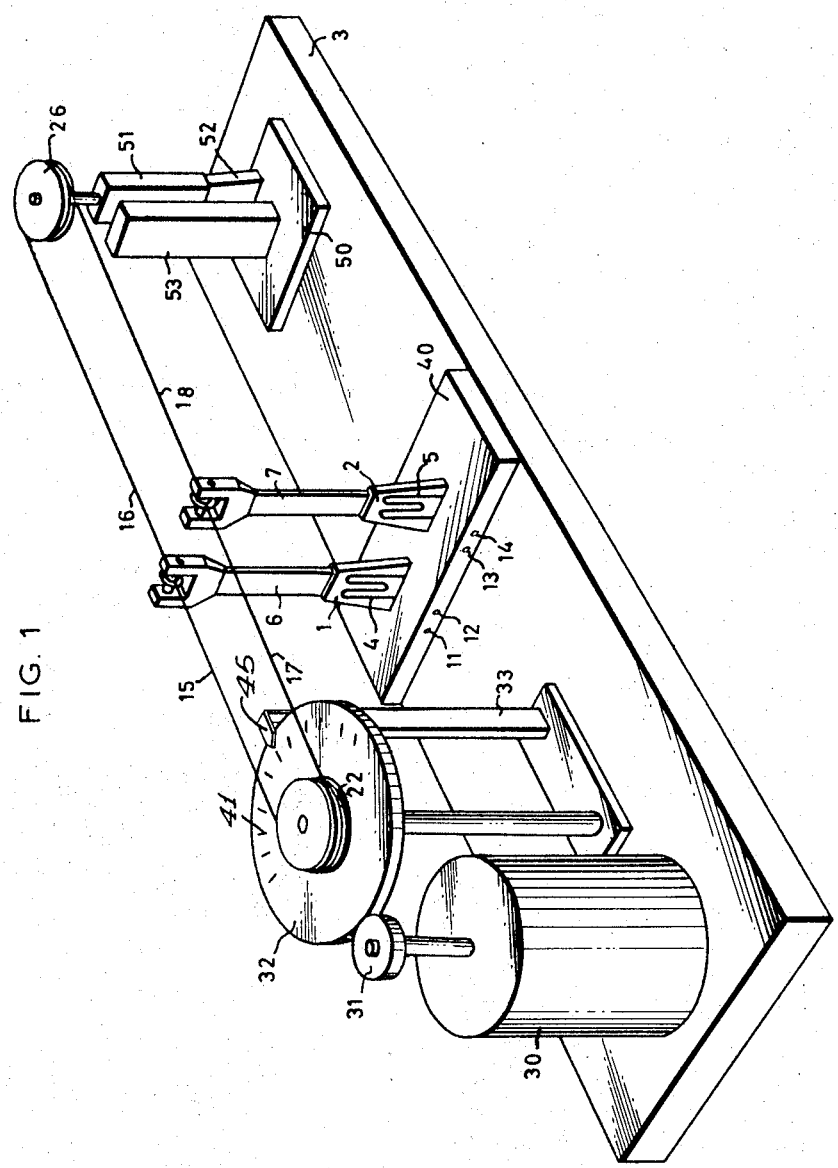
FIG. 1 is a perspective view of a preferred embodiment of a strain-gauge potentiometer according to the invention.

Referring to FIG. 1, two resilient strips 1, 2, for instance of beryllium bronze, of uniform thickness are provided in the shape of isosceles trapezoid whose major bases are mounted in a base plate 40, secured to a potentiometer frame 3 and whose minor bases receive rigid extension members 6, 7. Gauges in the form of resistive wire zig-zag wound on a smooth substrate, i.e., bonded strain-gauges, are secured longitudinally to the strips 1, 2; two—4 and 5—of the strain-gauges can be seen in FIG. 1 and the other two—4' and 5'—are disposed on those surfaces of the strips 1, 2 which are hidden in FIG. 1. The ends of the gauges are connected to terminals 11–14 of the base plate 40. It is assumed that the four guages are balanced when the strips 1, 2 are in the equilibrium position. This balancing can be achieved by means of extra resistors in a manner which is familiar to the engineer in the art and which need not be described here.

The rigid extension members 6, 7 aligned with the strips 1, 2 are secured to the free ends thereof, for instance by brazing. Through the agency of the extension members 6, 7 a force applied to the top of them in a direction perpendicular to the plane of the strips 1, 2 causes a substantially circular bending thereof, an effect which would not be achieved were the force to be applied to the top of the strips themselves. At the top the members 6, 7 are U-shaped to received a transverse shaft or spindle 8 disposed in the plane of the strips.

Figure 2:
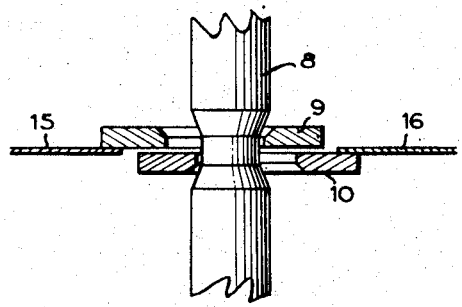
FIG. 2 shows details of how the cable is secured to the ends of the extension members of the resilient strips of the potentiometer shown in FIG. 1.

Rings 9, 10 visible in FIG. 2, are threaded onto the shafts 8. The rings 9, 10 are secured to portions of cable 15, 16, respectively, in the case of the rings on the shaft 8 of the member 6—and 17, 18—in the case of the rings on the shaft 8 of the member 7. The shaft 8 is formed at the center with a groove having inclined edges and guiding the rings 9, 10; the inner diameter thereof is slightly greater than the diameter of the groove and the inner edges thereof terminates in a partly inclined partly flat edge so that the rings 9, 10 are borne substantially at the bottom of the groove of the spindle. Advantageously the cables 15–18 are flexible metal strips or ribbons soldered to the respective opposite surfaces of the rings 9, 10.

Th eextensions of the oblique sides of the trapezoids intersect one another at the center of the shafts 8 mounted at the top ends of the members 6, 7. Consequently, the forces applied by the cables 15, 16 to the end of the member 6, and the forces applied by the cables 17, 18 to the end of the member 7 make the strips 1, 2 perform a circular bending movement as if they had a triangular shape and were operated at their top. The extension members do not prevent the strips 1, 2 from circular bending but localize such bending to the useful part of the strips 1, 2, i.e., the part comprising the gauges 4, 5 and 4', 5', so that the power required to deliver a given signal is reduced and the path travelled by the places to which the forces are applied is straighter.

The cables 15, 17 engage in two very close-together grooves 19, 20 in a pulley 21 and are secured thereto at two anchorage places. The position of the pulley 21 is fixed relatively to the frame 3. The pulley 21 is driven by an electric motor 30, for instance a two-phase motor, via a first gear 31 and a second gear 32 which is rigidly secured to the pulley 21.

Figure 4A:
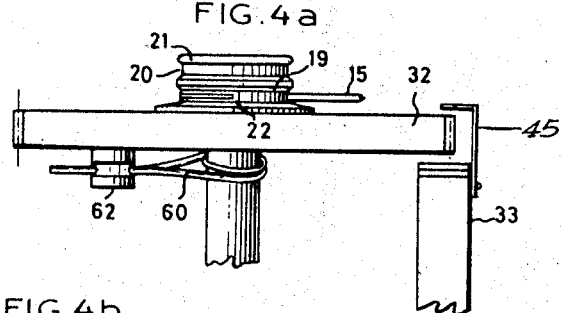
FIGS. 4a and 4b are views, in elevation and plan respectively, showing details of the double-resilient stop of the drive pulley of the potentiometer shown in FIG. 1.

FIG. 4a shows details of the pulley 21 and of the two flat-bottomed grooves 19, 20 therein for the metal straps 15, 17. Also shown are the tape 15 and its anchorage place 22; the tape 17 and its anchorage place (not shown) are symmetrical of the tape 15 and of the anchorage place 22 relatively to the plane of FIG. 4a. The ends of the straps 15 and 17 overlap each other and this overlap means that the pulley 21 can rotate through very much more than 180°.

Figure 3:
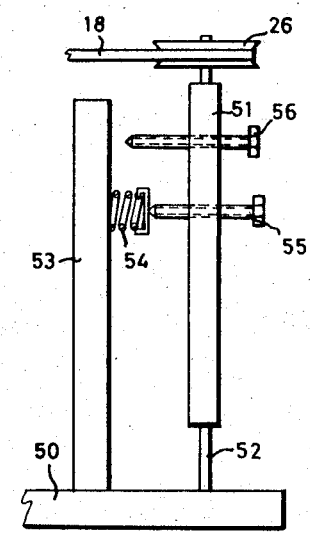
FIG. 3 shows details of how the reversing pulley of the potentiometer shown in FIG. 1 is secured.

The straps 16, 18 engage in a single groove of a reversing pulley 26. FIG. 3 shows, together with its securing system, the pulley 26 which is used just as a reversing pulley for the two runs 16, 18 of a single metal strap. The pulley 26 is formed with just a single flat-bottomed groove and its spindle is secured to a support member 51 connected to the frame 3 via a flexible strip 52 mounted in a base plate 50. The loop formed by the tapes 16, 18 is kept tensioned by a spring 54 which bears against an abutment 53 and which biases the support member 51 through the agency of an adjusting screw 55. A safety screw 56 limits the movement towards one another of the support member 51 and abutment 53 to ensure that the tape 16, 18 cannot accidentally disengage from the groove in the pulley 26.

Figure 4B:
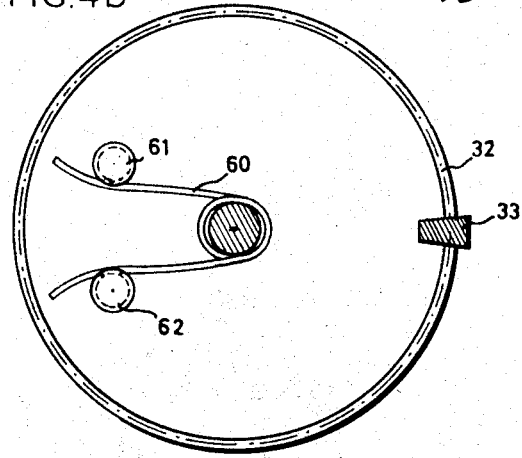

Advantageously, since the effective movement of the pulleys is much more than half a revolution, and to prevent violet impacts but still provide an effective braking at the ends of travel, a prestressed reilient stop is used on the pulley 21, such as is shown in FIGS. 4a and 4b. Such resilient stop takes the form of a column 33 secured to the frame 3 in the plane of symmetry of the device, and of a spring 60 which is wound around the shaft bearing the gear 32 near the bottom surface thereof and which is kept tensioned by two abutments 61, 62 secured to the bottom surface of the gear 32 at some distance from the periphery thereof. The abutments 61, 62 are formed with grooves which keep the spring 60 at a predetermined distance from the bottom surface of the gear 32. The top part of the column 33 comes near the peripheral part of the bottom surface of the gear 32 so as to allow the stops or abutments 61, 62 a free passage and to form an abutment for the ends of the springs 60. To prevent such ends from sliding vertically along the column 33, the same is formed, on those two surfaces against which the ends of the spring 60 bear, with two grooves which are at the same level as the grooves in the abutments 61, 62.

Figure 5:
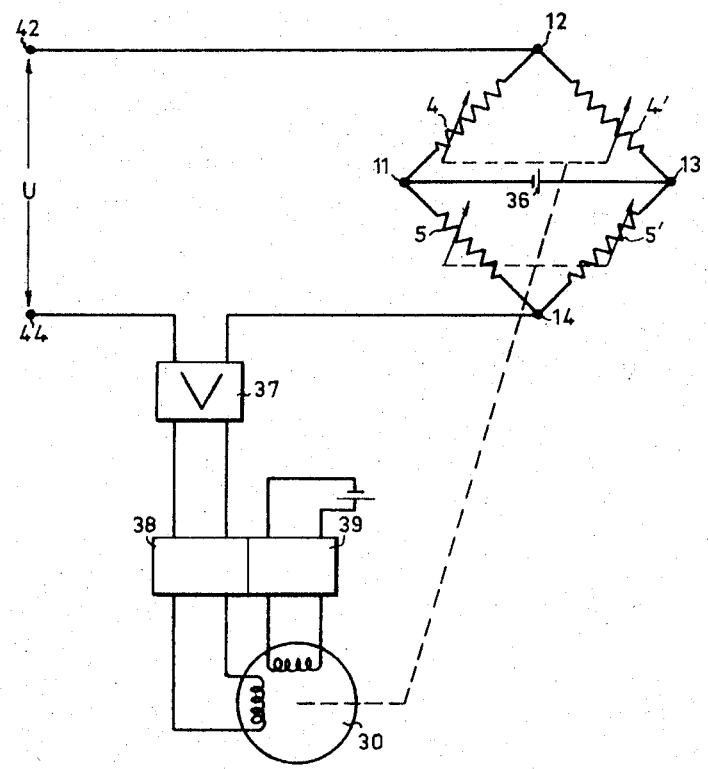
FIG. 5 is a circuit diagram showing the potentiometer according to the invention connected up in a conventional low-voltage measurement chain.

Operation will be readily apparent and will be described with reference to FIG. 5.

To measure, for instance, a D.C. voltage U appearing across terminals 42 and 44, and assuming, for instance, that the terminal 42 is positive to the terminal 44, the voltage U is arranged to buck the Wheatstone bridge output voltage delivered at the terminals 12 and 14. The potentiometer is supplied by a standard voltage source 36 across its diagonal between the terminals 11 and 13. The difference signal is applied to an amplifier 37, then to a vibrator 38, and finally to one of the windings of the two-phase motor 30. The other winding thereof is supplied with a reference phase produced, for instance, by a vibrator 39 in phase quadrature with the vibrator 38. This control arrangement is completely familiar to the engineer in the art and is immaterial so far as the invention concerned. The motor 30 drives the pulley 21 so as to bend the strips 1, 2 in directions such that the gauge 4 increases its resistance and the gauge 4' decreases its resistance (strip 1 bent towards pulley 26) and the gauge 5 decreases its resistance and the gauge 5' increases its resistance (strip 2 bent towards pulley 21). The terminal 12 becomes positive to the terminal 14, and the motor 30 stops when the voltage across the terminals 12 and 14 is equal to the voltage across the terminals 42 and 44. The top surface of the pulley 21 is marked with a voltage scale 41 cooperating with a pointer 45.

Certain obvious modifications are possible without departing from the spirit and the scope of the invention and which adapt the invention for different uses. For instance, means can be provided to disengage the gear 31 from the shaft of the motor 30; if required, the motor 30 can be replaced by a hard friction drive flywheel, while the tops of the extension members 6, 7 can be operated by other means—e.g., by metal rods.

What I claim is:

1. In a self-balancing potentiometer including four resistive wire strain-gauges connected into a Wheatstone bridge, means for applying an input signal to be measured to said bridge, an electric motor fed by the unbalance signal of said bridge, a pulley driven by said electric motor, a flexible cable means trained around said pulley so as to be driven thereby, and means for subtracting from said input signal a rebalancing signal, a motion to electricity transducer adapted to produce said rebalancing signal comprising a base means, two resilient metal strips of uniform thickness secured at one end thereof to said base means, said strips having the shape of an isosceles trapezoid having two parallel horizontal sides and two oblique lateral sides, said strain gauges being bonded to the two faces of each of said strips, two rigid extension members respectively secured at the other end of said resilient strips and aligned therewith, said extension members having shell-shaped top ends, two transverse spindles disposed across said shell-shaped top ends in the plane of said strips at the point of intersection of the two oblique sides of the trapezoid-shaped strips, a second cable means, a reversing pulley circumvented by said second cable means, means for connecting said first and second cable means which circumvent said driving and reversing pulleys to said spindles to cause said strips to bend in opposite directions from an equilibrium position thereof, whereby the length variation of the resistive wires of the strain gauges is proportional to said rebalancing signal.

2. In a self-balancing potentiometer including four resistive wire strain-gauges connected into a Wheatstone bridge, means for applying an input signal to be measured to said bridge, an electric motor fed by the unbalanced signal of said bridge, a pulley driven by said electric motor, a flexible cable means trained around said pulley so as to be driven thereby, and means for subtracting from said input signal a rebalancing signal, a motion to electricity transducer adapted to produce said rebalancing signal, comprising a base means, two resilient metal strips of uniform thickness secured at one end thereof to said base means, said strain-gauges being bonded to the two faces of each of said strips, two rigid extension members respectively secured at the other end of said resilient strips and aligned therewith, a second cable means, a reversing pulley circumvented by said second cable means, means for connecting said first and second cable means which circumvent said driving and reversing pulleys to the tops of said members to cause said strips to bend in opposite directions from an equilibrium position thereof, and a prestressed spring secured to said pulley and a resilient stop cooperating with said spring to resiliently limit the rotation of said pulley.

3. In a self-balancing potentiometer including four resistive wire strain-gauges connected into a Wheatstone bridge, means for applying an input signal to be measured to said bridge, an electric motor fed by the unbalanced signal of said bridge, a pulley driven by said electric motor, a flexible cable means trained around said pulley so as to be driven thereby, and means for subtracting from said input signal a rebalancing signal, a motion to electricity transducer adapted to produce said rebalancing signal, comprising a base means, two resilient metal strips of uniform thickness secured at one end thereof to said base means, said strain-gauges being bonded to the two faces of each of said strips, two rigid extension members respectively secured at the other end of said resilient strips and aligned therewith, said extension members having shell-shaped top ends, two transverse spindles disposed across said shell-shaped top ends in the plane of said strips, a second cable means, a reversing pulley circumvented by said second cable means, means for connecting said first and second cable means which circumvent said driving and reversing pulleys to said spindles to cause said strips to bend in opposite directions from an equilibrium position thereof, and a prestressed spring secured to said pulley and a resilient stop cooperating with said spring to resiliently limit the rotation of said pulley.

4. In a self-balancing potentiometer including four resistive wire strain-gauges connected into a Wheatstone bridge, means for applying an input signal to be measured to said bridge, an electric motor fed by the unbalanced signal of said bridge, a pulley driven by said electric motor, a flexible cable means trained around said pulley so as to be driven thereby, and means for subtracting from said input signal a rebalancing signal, a motion to electricity transducer adapted to produce said rebalancing signal, comprising a base means, two resilient metal strips of uniform thickness secured at one end thereof to said base means, said strips having the shape of an isosceles trapezoid having two parallel horizontal sides and two oblique lateral sides, said strain-gauges being bonded to the two faces of each of said strips, two rigid extension members respectively secured at the other end of said resilient strips and aligned therewith, said extension members having shell-shaped top ends, two transverse spindles disposed across said shell-shaped top ends in the plane of said strips at the point of intersection of the two oblique sides of the tapezoid-shaped strips, a second cable means, a reversing pulley circumvented by said second cable means, means for connecting said first and second cable means which circumvent said driving and reversing pulley to said spindle to cause said strips to bend in opposite directions from an equilibrium position thereof, and a prestressed spring secured to said pulley and a resilient stop cooperating with said spring to resiliently limit the rotation of said pulley.

References Cited

UNITED STATES PATENTS 3,056,936   10/1962   Leyenberger et al. _____ 338—67

RICHARD C. QUEISSER, *Primary Examiner.*

C. I. McCLELLAND, *Assistant Examiner.*